(12) United States Patent
Nation et al.

(10) Patent No.: US 7,069,523 B2
(45) Date of Patent: Jun. 27, 2006

(54) AUTOMATED SELECTION AND PLACEMENT OF MEMORY DURING DESIGN OF AN INTEGRATED CIRCUIT

(75) Inventors: George Wayne Nation, Eyota, MN (US); Gary Scott Delp, Rochester, MN (US); Paul Gary Reuland, Rochester, MN (US)

(73) Assignee: LSI Logic Corporation, Milpitas, CA (US)

(*) Notice: Subject to any disclaimer, the term of this patent is extended or adjusted under 35 U.S.C. 154(b) by 26 days.

(21) Appl. No.: 10/318,623

(22) Filed: Dec. 13, 2002

(65) Prior Publication Data

US 2004/0117744 A1 Jun. 17, 2004

(51) Int. Cl.
*G06F 17/50* (2006.01)

(52) U.S. Cl. .............................. 716/2; 716/6; 716/18; 714/718

(58) Field of Classification Search .............. 716/2, 716/6, 18, 1, 7, 8; 714/718
See application file for complete search history.

(56) References Cited

U.S. PATENT DOCUMENTS

| | | | |
|---|---|---|---|
| 4,656,592 A | | 4/1987 | Spaanenburg et al. |
| 5,159,678 A | * | 10/1992 | Wengelski et al. ........... 711/153 |
| 5,406,525 A | * | 4/1995 | Nicholes ................. 365/230.02 |
| 5,737,234 A | | 4/1998 | Seidel et al. |
| 5,818,728 A | | 10/1998 | Yoeli et al. |
| 5,818,729 A | | 10/1998 | Wang et al. |
| 6,105,053 A | * | 8/2000 | Kimmel et al. .............. 718/105 |
| 6,377,912 B1 | * | 4/2002 | Sample et al. ................. 703/28 |
| 6,425,116 B1 | * | 7/2002 | Duboc et al. .................. 716/18 |
| 6,459,136 B1 | | 10/2002 | Amarilio et al. |
| 6,552,410 B1 | | 4/2003 | Eaton et al. |
| 6,629,223 B1 | * | 9/2003 | Bachot et al. ............... 711/167 |
| 6,779,100 B1 | | 8/2004 | Keltcher et al. |
| 2004/0019756 A1 | | 1/2004 | Perego et al. |

FOREIGN PATENT DOCUMENTS

| | | |
|---|---|---|
| JP | 01202397 | 7/2001 |
| JP | 02202886 | 7/2002 |

OTHER PUBLICATIONS

Shiue, "Low Power Memory Design", Jul. 2002, IEEE, Proceedings, International Conference on Application-Specific Systems, Architectures and Processors, pp. 55–64.*

(Continued)

*Primary Examiner*—Sun James Lin
(74) *Attorney, Agent, or Firm*—Ojanen Law Offices (57) ABSTRACT

A tool for designing integrated circuits that optimizes the placement and timing of memory blocks within the circuit. Given a manufactured slice that has a number of blocks already diffused and logically integrated, the memory generation tool herein automatically considers the available diffused memory and the gate array of the slices to configure and optimize them into a customer's requirements for memory. The memory generation tool has a memory manager, a memory resource database, a memory resource selector, and a memory composer. Together these all interact to generate memories from the available memories within the memory resource database. The memory composer actually generates the RTL logic shells for the memories, and outputs the memory designs in Verilog, VHDL, or other tool synthesis language. Once a memory is created, it is tested. Upon successful testing, the memory manager updates the memory resource database to indicate the successfully tested memory is no longer available as a resource for the generation of further memories. A design integrator may review the memory designs output and further integrate the memory, its timing, testing, etc. with other blocks and functions of the integrated circuit.

15 Claims, 5 Drawing Sheets

OTHER PUBLICATIONS

LSI Logic Corp: "Product Brief: Rapid Chip Semiconductor Platform" Dec. 1, 2002, pp. 1–5, XP002304387, from http://web.archive.org/web20021201195647/http://www.lsilogic.com/techlib/marketing_docs/rapidchipj/rapidchip_pb.pdf.

Ogrenci–Mernik, et al., "SPS: A Stragegically Programmable System", Reconfigurable Architectures Workshop Raw '01, San Francisco, Apr. 2001, pp. 1–8, XP002304440, retrieved from http://www.cs.ucla.edu/(seda/raw01_sps_architecture.pdf.

Anonymous, "52SX Family FPGA" Mar. 2001, pp. 1–10, XP002304714 from Actel Website www.actel.com/documents/RTSXDS.pdf.

* cited by examiner

AUTOMATED SELECTION AND PLACEMENT OF MEMORY DURING DESIGN OF AN INTEGRATED CIRCUIT

CROSS REFERENCE TO RELATED APPLICATIONS

The present application is related to the following United States Patent Applications, which are hereby incorporated by reference in their entireties: copending U.S. Ser. No. 10/325,114 entitled FLOW CONTROL ENHANCEMENT filed 20 Dec. 2002; copending U.S. Ser. No. 10/435,168 entitled AUTOMATION OF THE DEVELOPMENT, TESTING, AND RELEASE OF A FLOW FRAMEWORK AND METHODOLOGY TO DESIGN INTEGRATED CIRCUITS filed 08 May 2003; copending U.S. Ser. No. 10/335,360 entitled A SIMPLIFIED PROCESS TO DESIGN INTEGRATED CIRCUITS filed 31 Dec. 2002; U.S. Ser. No. 10/318,792 entitled FLEXIBLE TEMPLATE HAVING EMBEDDED GATE ARRAY AND COMPOSABLE MEMORY FOR INTEGRATED CIRCUITS filed 13 Dec. 2002; U.S. Pat. No. 6,823,502 entitled PLACEMENT OF CONFIGURABLE INPUT/OUTPUT BUFFER STRUCTURES DURING THE DESIGN OF INTEGRATED CIRCUITS; copending U.S. Ser. No. 10/468,186 entitled DESIGNING AND TESTING THE INTERCONNECTION OF ADDRESSABLE DEVICES OF INTEGRATED CIRCUITS filed 19 Jun. 2003; copending U.S. Ser. No. 10/316,101 entitled METHOD FOR COMPOSING MEMORY ON PROGRAMMABLE PLATFORM DEVICES TO MEET VARIED MEMORY REQUIREMENTS WITH A FIXED SET OF RESOURCES filed 09 Dec. 2002.

FIELD OF THE INVENTION

This invention relates generally to the field of electronic circuit design and more particularly relates to a computerized tool and process to develop a correct and optimal set of memories on an integrated circuit as specified by a design engineer from a combination of available diffused and/or memory structures automatically generated from a logic array.

BACKGROUND

Integrated circuits and chips have become increasingly complex, with the speed and capacity of chips doubling about every eighteen months. This increase has resulted from advances in design software, fabrication technology, semiconductor materials, and chip design. The increased density of transistors per square centimeter and faster clock speeds, however, make it increasingly difficult to specify and design chips that perform as actually specified. Unanticipated and sometimes subtle interactions between the transistors and other electronic structures may adversely affect the performance of the circuit. These difficulties increase the expense and risk of designing and fabricating chips, especially those that are custom designed for a specific application. The demand for complex custom-designed chips increases with the burgeoning number and variety of applications and products controlled by microprocessors yet the time and money required to design chips have become a bottleneck in bringing these products to market. Without an assured successful outcome within a specified time, the risks have risen along with costs, and the result is that fewer organizations are willing to attempt the design and manufacture of custom chips.

Electronics are comprised of a myriad of semiconductor integrated circuits in complex arrangements intended to optimize the operation of the electronics. The integrated circuits may be arranged into blocks associated with a particular function. For instance, there may be several blocks involved in only the input/output (I/O) of signals to and from another block or group of blocks; there may be blocks of circuits and logic gates whose primary function is to store instantaneous state of the signals, such as registers and other memory units such as buffers, caches, etc.; there may be blocks having a primary purpose of manipulation of the signals using transistors, such as the logic gates and processors; there may be blocks whose only function may be the continuous monitoring and testing of the other blocks, etc. The parameters affecting the optimization of the operation of the integrated circuits, the chip as a whole, and each individual block are numerous and include, among other things, the functional features of the block, e.g., if the block is to be configured into memory, the size and number of ports of the memory, the location and configurability of the blocks together, the status of the blocks, the control logic of the blocks, the enabled features of the blocks, the type of testing of the blocks, the frequency and speed of the electrical signals traveling between and within the blocks; the interfaces between the blocks; the logic within the blocks, etc.

The design of integrated circuits and the placement of the blocks has been a tedious and specialized engineering task. Given a particular arrangement of the blocks on an integrated circuit, the more flexible a design, the more time it takes for a chip designer to modify and test any changes made to the design. For instance, an application-specific standard product (ASSP) such as off-the-shelf chips have no flexibility and yet the time to modify is short because another chip can be easily obtained from the shelf if another function is desired. Application specific integrated circuits (ASICs) increase in flexibility but are also more difficult to modify than standard products; just as metal layer programmable gate arrays (PGAs) are even more flexible in the numerous possible applications that can be achieved but more time-consuming to modify and test. Lastly, on the far end of the scale are field programmable gate arrays (FPGAs) that are very flexible and easy to modify but are very expensive and have a large die size.

Some fundamental anatomy of an integrated circuit will be helpful for a full understanding of the factors affecting the flexibility and difficulty in modifying designs. An integrated circuit is basically layers of a semiconductor, usually silicon, with specific areas and layers having different concentrations of electron and hole carriers and/or insulators. These specific areas and layers may interact with each other by field interactions or by direct electrical interconnections. These electrical interconnections may be within the semiconductor, or more usually, above the semiconductor areas and layers using a complex mesh of metal layers. Thus, with ASSPs and ASICs, all aspects of the integrated circuit are fixed, whereas with, e.g., PGAs and PFGAs, the interconnections and the logic can be programmed to achieve different functions. It is important to remember, however, that once the chip is manufactured, these parameters do not change and that reprogramming or modifying a feature is possible but difficult unless the chip has been specifically made for reprogramming.

A difficult optimization and construction problem of integrated circuits is that of constructing the various memory arrays required for any of the distinct designs. As a simplified example, a design for an integrated circuit might specify four memories, each 40 bits wide by 1024 words deep, organized as two-ported memory capable of a five nanosecond synchronous cycle time. But a customer specification may require three memories, the first of which may be 45 bits by 2048 words, have one port, and a cycle time of seven nanoseconds. The customer's second memory may be, e.g., 32 bits by 512 words, have two ports, and a cycle time of seven nanoseconds also. The third customer memory may be 32 bits by 512 words, have four ports with a cycle time of three nanoseconds.

Not only must the design engineer select and match gate arrays to create the required memory which is an extremely difficult optimization problem in itself, but the designer must also create the logic and other design views of these composed memories. This logic called register transfer logic (RTL) connects to the diffused memory and any generated memories from the logic array to create the required interface for compatibility of data width addressing, control, clock, and test, etc.

There is thus a need in the industry to increase the flexibility of the design process of the integrated circuits yet at the same time reduce the cost of each individual design.

SUMMARY OF THE INVENTION

The present invention provides for a memory generation tool used in the design and development of integrated circuits comprising: (a) a memory manager having as input a description of a slice and a request for at least one memory; (b) a memory resource database comprising a plurality of available memory resources of the description; (c) a memory resource selector capable of selecting candidate memory resources from the available memory resources to satisfy the request; and (d) a memory composer capable of generating at least one memory design from the candidate memory resources to satisfy the request. The available memory resources comprised diffused memory available from a slice description or may be generated from the logic gate array to be flop-based memory or R-cell memory by the memory composer. The memory composer also generates a memory wrapper, other RTL shells, and, inter alia, verification shells. The memory manager maintains and updates the memory resource database when any of the available memory resources have been allocated to satisfy the request for memory. It is the memory resource selector that selects the memory in the memory resource database to satisfy the request; the memory resource selector may select more than one type of memory to combine to satisfy the request, and will give priority to those available memory resources that have compatible power and/or timing and/or size.

The memory generation tool may further comprise a design database of the hardmacs and/or logic gate array that has been allocated and configured for other functions, not just memory, of the integrated circuit; a design integrator to integrate any memory designs into other functions of the integrated circuit; and a design qualifier to determine if the memory design is compatible with the other functions of the integrated circuit.

The invention may further devise a programmable medium having the memory generation tool thereon, wherein the programmable medium is available to a computer system to enable the computer system to generate memories by reading a description of a slice having either diffused memory or gate array logic; reading a specification of at a requested memory for an integrated circuit; determining if the specification of the requested memory can be generated from the description of the slice; if so, then allocating a portion of the either the diffused memory and/or the gate array logic to the requested memory; generating a logic infrastructure for the allocated portion; creating a memory design of the allocated portion; and then updating a memory resource database to indicate the allocated portion is not available for anymore requested memories Objects, features, and advantages of the invention may further be realized by a method of generating memory designs for an integrated circuit, comprising the steps of: inputting available memory resources into a memory resource database; inputting a request for at least one memory; selecting possible memory resources from the available memory resources to satisfy the request. The method would further consider the size, power, timing characteristics of the possible memory resources to satisfy the request. The request could be satisfied by combining diffused memory, R-cell memory, flop-based memory, either separately or together, so long as size, power, and timing characteristics are compatible. The method could test the memories and then update the memory resource database to indicate that the memory has been generated.

BRIEF DESCRIPTION OF THE DRAWINGS

The numerous advantages of the present invention may be better understood by reference to the accompanying figures in which.

DESCRIPTION OF THE INVENTION

What is envisioned and disclosed herein is a computer hardware design tool installed on a computer system for designing, allocating, and integrating memory blocks on integrated circuits, also referred to as chips. The context for the design tool disclosed herein is to use a semiconductor slice having an embedded array of gate logic and having preestablished diffused memories distributed on the slice. The computer system upon which the design tool is installed may comprise any number of networked computers or a stand alone system, as is known in the art. Each computer system, moreover, may have one or more general-purpose programmable processors, executing instructions stored in memory, and may have one or more communications buses to support the transfer of data, commands and other information within and without the computer system.

The computer system has an operating system and one or more applications, preferably the integrated chip development tool as described herein and referred to as memory generation tool, which reside in memory. The operating system provides, inter alia, functions such as device interfaces, management of memory pages, management of multiple tasks, etc. as is known in the art. Examples of such operating systems may include, e.g., Unix or a derivative thereof or a Windows-based operating system. These and other various applications, components, programs, objects, etc. may also execute on one or more processors in another computer coupled to computer via a network, e.g., in a distributed or client-server computing environment, whereby the processing required to implement the functions of a computer program may be allocated to multiple computers over a network. In general, the routines executed to implement the embodiments of the invention, whether implemented as part of an operating system or a specific application, component, program, object, or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention.

Those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks, e.g., CD-ROM's, DVD's, etc., among others, and transmission type media such as digital and analog communication links. In addition, various programs described hereinafter may be identified based upon the application for which they are implemented in a specific embodiment of the invention. Any particular program nomenclature that follows is used merely for convenience, and thus the invention should not be limited to use solely in any specific application identified and/or implied by such nomenclature. The illustrated embodiments are not intended to limit the present invention. Indeed, those skilled in the art will recognize that other alternative hardware and/or software embodiments may be used without departing from the scope of the invention.

Figure 1:
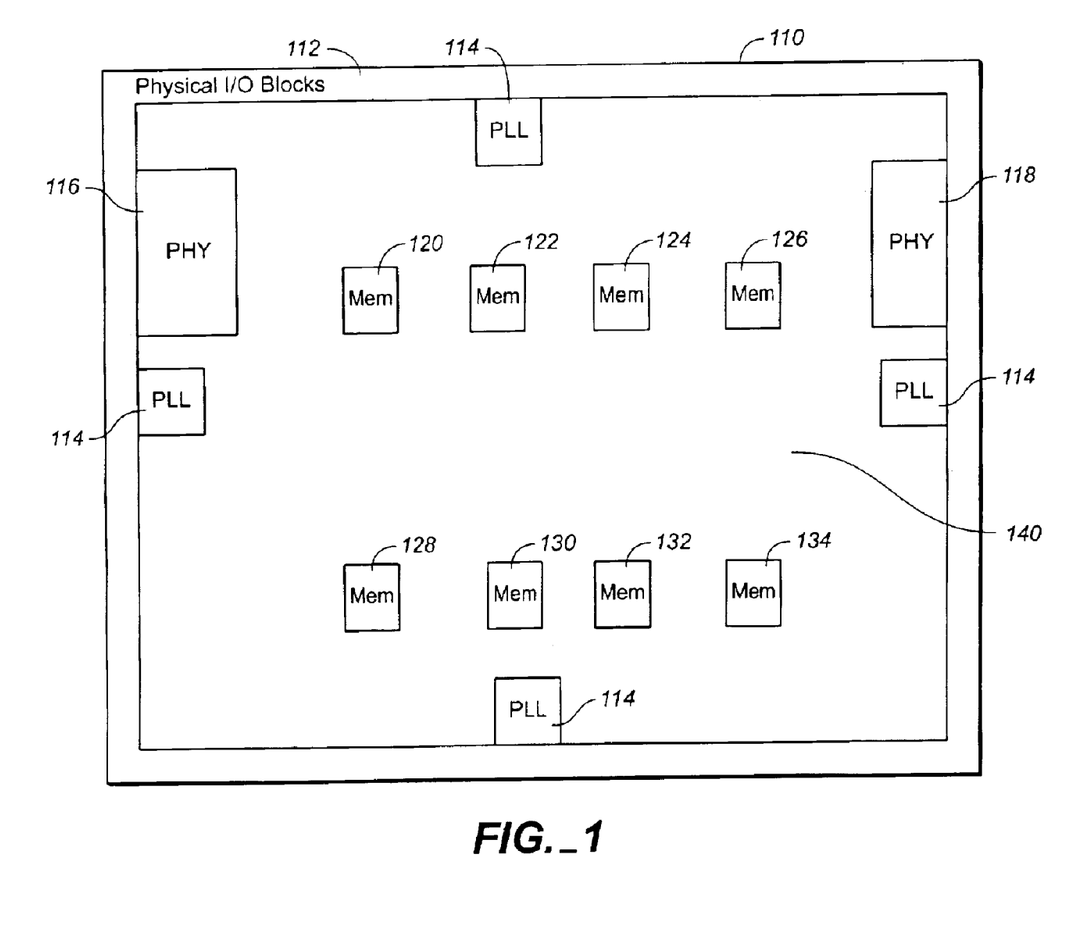
FIG. 1 is a definition of a slice having prefabricated blocks for use in an integrated circuit according to principles of the invention

Viewing FIG. 1, a base semiconductor slice 110 is shown. The semiconductor die may be of silicon, silicon-on-insulator, silicon germanium, gallium arsenide, other Type II, III, IV, and V semiconductor, which then may be cut into square or rectangular pieces into which specific blocks or hardmacs have been fabricated or diffused to form the slice 110, i.e., particular arrangements of transistors were fabricated into the wafer layers to create particular electronic functions. Around the periphery of the slice 110, I/O blocks 112 can be configured to receive and transmit data through a number of ports. Also placed strategically, shown here at the centers of each side towards the I/O blocks 112, are several hardmacs for phase locked loops (PLL) 114, critical for accurate clock and timing of the electrical signals throughout the final product. To implement a specific function to transfer data, there may be several hardmacs fabricated as PHYs 116, 118 which are diffused into the slice 110 as data transceivers for specific data transmission protocols, such as gigabit Ethernet and/or SPI4.2, or ATM, or any other proprietary or industry data transmission standard. A PHY refers to the hardware necessary to receive and transmit data, namely the transceiver. Towards the interior of the slice 110, there may be diffused memory hardmacs 120–134. Shown in FIG. 1, each of the eight diffused memory blocks 120–134 may have 256 rows, 80 columns (256×80) and 211 ports. Note that ports of the memory are given by way of example only; other size memories with a different number of ports may be included in the slice definition 110. Indeed, the entire slice may be nothing more than diffused memory with appropriate I/O and logic. In this case, however, also included in the slice 110 is a large area of undefined gate array 140 that can be configured into many different functions, including additional memory, necessary to or enhancements of operation of the intended final product. This arrangement of FIG. 1 is referred to as a slice definition because there is no specific customization or programming for the various functions.

Figure 2:
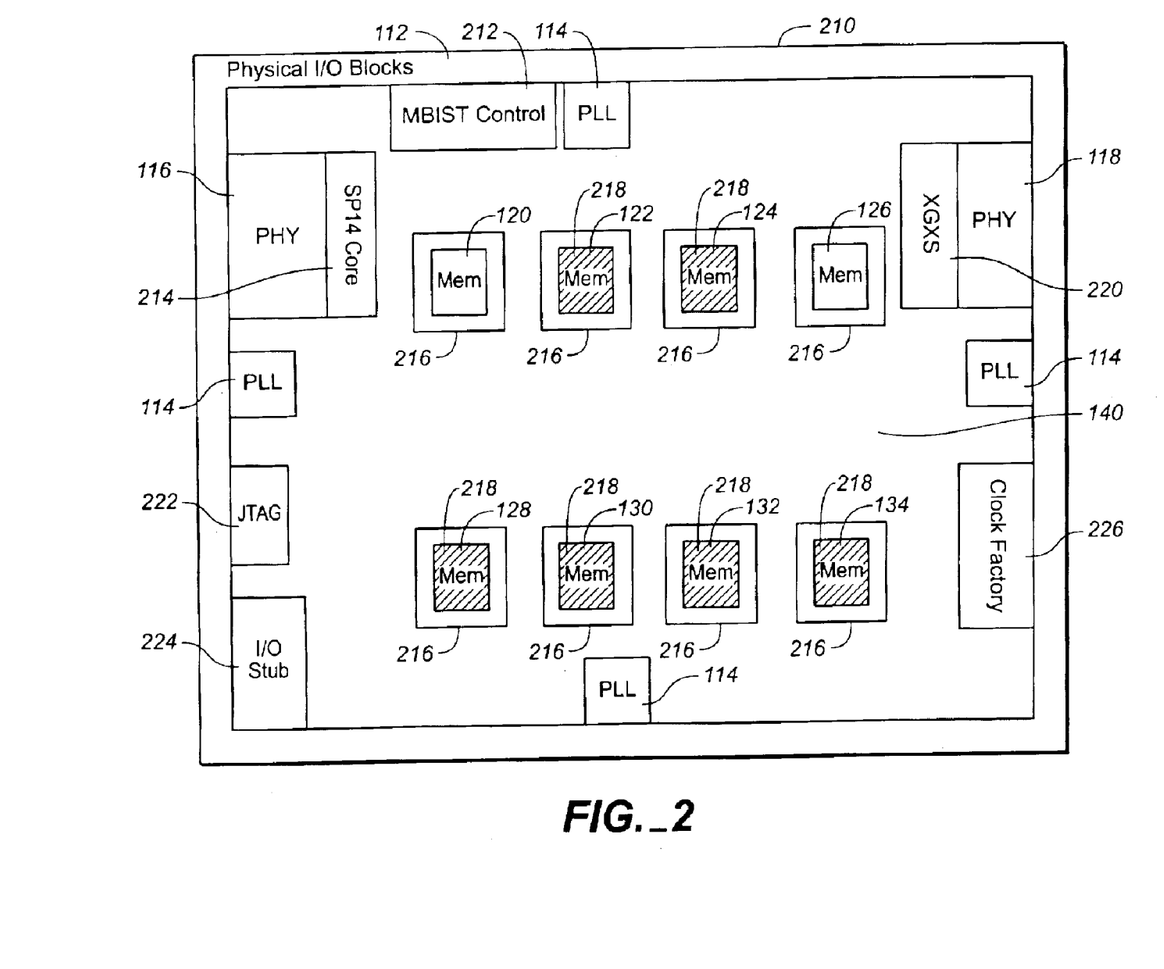
FIG. 2 is a simplified block diagram of an application set in accordance with principles of the invention.

FIG. 2 is a view of an application set 210. An application set 210 refers to the collection of a slice and its shells. The slice of FIG. 1 itself is of little use, it is only hardware; logic infrastructure is required to make the slice useful. Shells comprise this logic infrastructure and together, the shells and the slice comprise an application set 210. Thus, in FIG. 2, one can view all the hardmac features of the slice, i.e., the I/O blocks 112, the PLLs 114, the PHYs 116 and 118, the diffused memory 120–134, and the gate array 140. There are, however, additional logic infrastructures, i.e., shells, that make the slice functional.

Several shells may be used as a basis for different application sets. An RTL shell encapsulates the preplaced logic with which the diffused blocks interact, and typically includes a significant amount of preplaced, timed, and proven components, such as an analog SERDES protocol layer 214 or a XGXS protocol layer 220 for various transceiver PHYs, clock factory 226, microprocessors, etc. The RTL shell may comprise a simple logical interface to directly connect the signals to external chip I/Os, or it may be a more complex set of proven logic. Another shell available may be a synthesis shell having scripts to synthesize any generated logic for the final applications. These synthesis scripts will have been optimized for the slice's gate array library, its particular resources, and the gate array elements of the RTL shell. There may be a timing shell that includes the timing constraints for all blocks and interfaces. Stamp models of the RTL shell components connected to the chip I/Os may also be included. A verification shell may include components such as transactors, monitors or interface checkers, scoreboards, reference models, and test suites between the internal logic interfaces and the chip I/Os. A test shell might include a JTAG interface 222, a memory built-in self test (MBIST) controller 212, a stub interface 224 that brings test signals and scan chains to the interior logic plus any preexisting test engines and mechanisms in the shell and slice. Thus, the shells provide, inter alia, proven interfaces and controllers that may be in compliance with proprietary and industry standards. An application set 210 represents an integrated design, i.e., the slice and the shell, that has been verified with inserted clocks and test interconnects. The remainder of a design can be placed and routed amongst the existing resources to create the small set of remaining masks necessary to create a specialized I/O chip.

In particular, among the shells for creating memory arrays are a memory wrapper 216, and the RTL shell components 218. Thus, of the eight diffused memory blocks 120–134 with 256 rows, 80 columns and 211 ports, all have the RTL shell component 216, and six 122, 124, 128, 130, 132, 134 have been configured as a random access memory (RAM) 218 having fixed placement and routing with a wrapper indicating not to place metal layers on top of the RAM blocks. A logical memory created from the gate array logic would have relative placement and routing fixed but the placement and routing is performed with a place and route tool, rather than with RTL shell 216.

Figure 3:
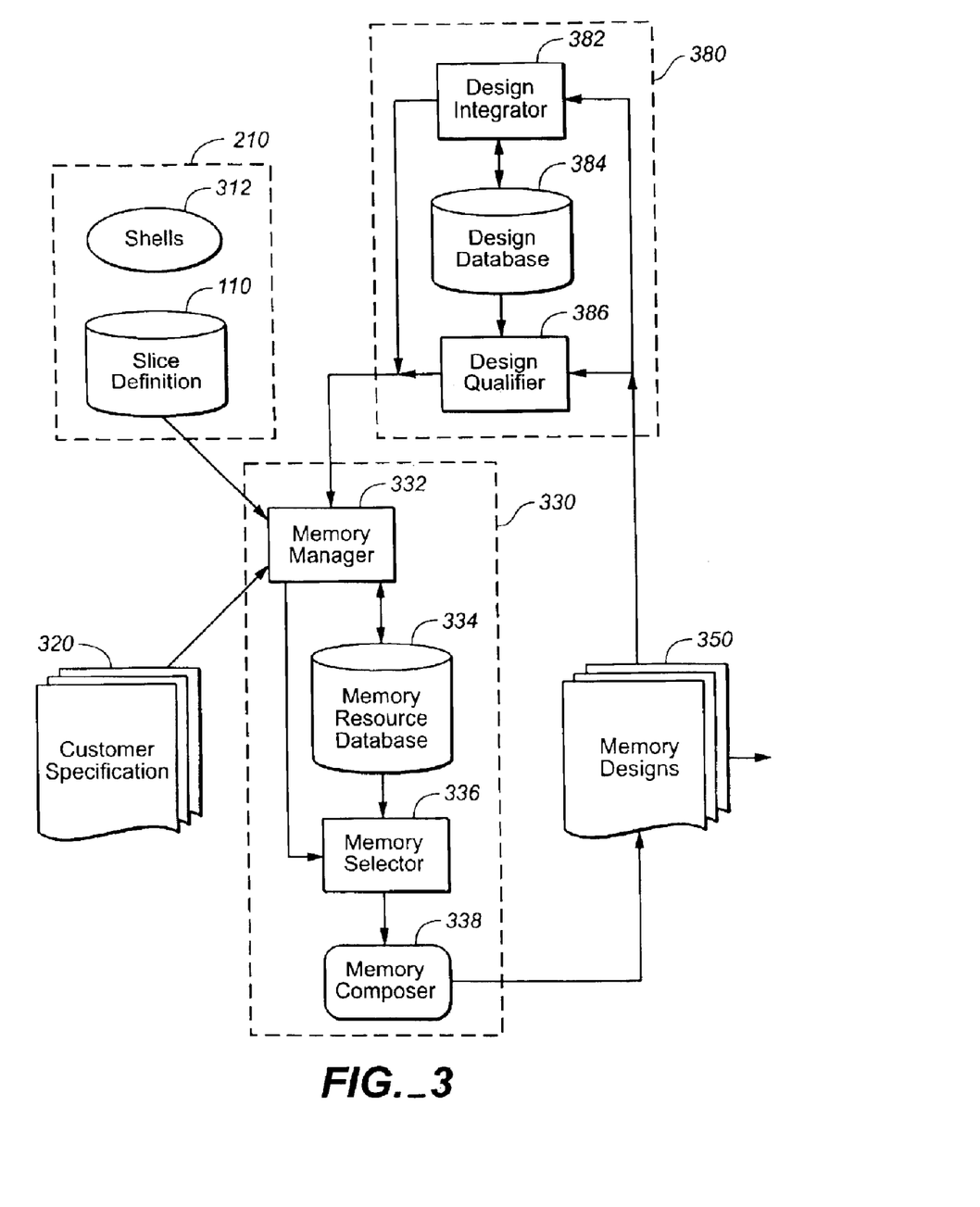
FIG. 3 is a simplified block diagram of the development tool and a process by which the development tool can generate the selection and placement of memories in an integrated circuit according to an embodiment of the invention.

Referring now to FIG. 3, the components of the general process by which memories can be configured and/or created is set forth. Block 110 comprises a slice description, such as the slice description 110 shown in FIG. 1. The slice definition 110 contains, inter alia, a subset of the eight memories diffused into the slice, including the area and physical placement of the memory arrays and the required connection or interface pins. The memory subset of the slice definition 110 may further detail the bit width and depth of the memory; details of the organization, i.e., the number of read/write ports, bit masking, etc. The required cycle time and the power estimates might be specified as well. The application set 210 comprises the slice definition 110 and any shells 216, 218 and other shells 312 necessary to enable the functions of the slice 110.

The customer specification 320 for the memory is a list of requirements for a given memory array to be generated and is provided by the customer to a chip designer using the memory generation tool 330 tool and methods described herein. A chip design might include a number N customer specifications 320 and in accordance with features of the invention herein, the customer specification(s) 320 are input to the memory generation tool 330 and may be processed in any order or in groups of up to N in size. Similar to the slice definition 110, the customer specification 320 may include details of the desired memory such as: bit width and depth, number of read/write ports, cycle time, number of cycles, physical location of the logic interface, power restrictions, bit and byte masking, etc.

The application set 210 and the customer specification 320 are input to the memory generation tool 330. The memory generation tool 330 may comprise the memory manager 332, the memory resource database 334, the memory resource selector 336 and the memory composer 338. The memory manager 332 maintains the overall set of memory and logic resources that have been used by any previous generated memories. The memory manager 332 also receives and interprets new requests for additions, changes, or deletions to the set of generated memories. The memory manager 332 always looks into the memory resource database 334, updates and queries the memory resource database 334 and instructs the memory resource selector 336 to list diffused and gate array regions available on the slice that can be used to construct the requested memory. The memory manager 332 also updates the memory resource database 334 with the complete view of generated memories for use in further optimization passes. The memory manager 332 thus manages the overall efficiency of the entire collections of generated memories by building sets of metrics based on the generation order and contributes to the generation reordering process. The memory manager 332 maintains not only the order in which the memories are requested, but also details of the physical placement of the customer logic from the memory resource database 334 and the partitioning of the memories.

The memory resource selector 336 receives the current customer specification 320 from the memory manager 332. The memory resource selector 336 also references the slice definition 110 and the memory resource database 334 to select from either or both the diffused memory 120–134 and the gate array 140 to generate memory for the customer specification 320. There are several classes of static memories which can be used and/or generated for an optimal and testable memory design, namely, diffused memory, a dense memory fabricated into the wafer layers of the slice, R-cell memory, sometimes also called A-cell memory, having optimal test and scan structures and is not as dense as diffused memory, and a latch- or flop-based memory which has been generated from the gate array and is not as dense as the R-cell memory. The combination characteristics of the memories, the power consumption, and any design restrictions on memory allocation, such as sticks, are also given priority by the memory resource selector 336 but are maintained by the memory manager 332. In one embodiment, the memory resource selector 336 has context only for the current requested memory and for the entire set of previously generated memories. In an alternative embodiment, however, the memory resource selector 336 may be designed to view multiple customer specifications and thus assume some or more of the global optimization tasks of the memory manager 332. When selecting the memory elements needed for a requested memory, the memory resource selector 336 considers such parameters as the available memory elements vs. generated memory elements, the performance and organization of the available memories and technology characteristics, the timing margins, and the physical location of the memory blocks with respect to the customer logic connected to it. The memory resource selector 336 further performs a local optimization by weighting these parameters and then builds a list of memory elements that may support the requested memory. If the requested memory cannot be constructed from available resources, the memory resource selector 336 then communicates this result to the memory manager 332.

Assuming, however, that the resources of the slice definition 110 are available for the customer specification 320, the memory resource selector 336 selects the candidate memory elements. The selected candidate memory elements along with the customer specification 320 are passed to the memory composer 338. It is the memory composer 338 that actually generates the memories from the diffused memory hardmacs and/or R-cell or the flop/latch-based memories from the gate array. The memory composer 338 considers the timing margins, the wire lengths, and the utilization of memory resources. The memory composer 338 also provides feedback to the memory manager 332 in case it is not possible to create the requested memory from the candidate elements. Generally, the memory composer 338 generates the memory designs 350 which may comprise RTL and other shells, a simulation array, timing constraints, and synthesis scripts for the requested memory as output to the customer. The memory designs 350 are preferably files in Verilog or VHDL. Memory composer 338 is preferably as described in copending patent application U.S. Ser. No. 10/316,101 entitled Method for Composing Memory on Programmable Platform Devices to Meet Varied Memory Requirements with a Fixed Set of Resources filed 09 Dec. 2002, which patent application is hereby incorporated by reference in its entirety.

Thus, the memory generation tool 330 comprising the memory manager 332, the memory resource database 334, the memory selector 336 and the memory composer 338 creates the shells for the diffused memories on a slice, creates R-cell memories and memories from the gate array for individual designs, and creates memory wrappers and manages the fixed memory resources on the slice to meet a specific application's needs. The memory wrappers are part of the RTL shells created by the memory composer 338 tool and may provide the following functions: enable MBIST; provide logic structures to combine multiple memories to form a single logical memory, create flops and control for addition of pipeline stages of a single memory generated from one or more diffused memory and/or gate arrays. The memory wrappers may further provide tie-offs for unused memory columns and rows that are compatible with the testing logic, provide memory protection logic for parity or error correction code (ECC), and provide time division multiplexing for simulating multiport memory.

The memory designs 350 may then be integrated into the design of the entire chip by the section labeled chip integration 380. The design integrator 382 receives the memory designs 350 and stitches them into the overall chip design held in the design database 384. The design qualifier 386 is a RTL or netlist qualification tool that determines, inter alia, if the design is likely to meet timing requirements under a set of design margin or technology assumptions. The design qualifier 386 also determines the number of required gates, the pin density, the power consumption and/or power density of the design. These qualifying inquiries may be run at an abstract level to obtain faster, sooner results which may inform the designer that a design is or is not likely to run at its expected criteria. Later in a design cycle, however, these qualifiers will be more exact because the design qualifier 386 will work with a more complete synthesized and timed design. What is important to note here, however, is that design qualification is a task of varying degrees of precision and accuracy.

Once the requested memory is constructed, integrated, and qualified the memory manager 332 updates the memory resource database 334 with exact details of the constructed memory and proceeds with the next iteration of the process.

As mentioned above, not only may the integrative and qualifying tasks be bypassed, in the planning process, a designer may wish to determine if a particular slice is appropriate for a design, i.e., are there enough of the proper types of memory? In the beginning of a design, the designer may input the customer specification 320 into the memory manager 332 and bypass the memory composer 338 as well as the design integrator 382 and design qualifier 386 simply because the designer is experimenting or otherwise trying out possible designs and there may not be enough of a design to warrant these tasks. The result would be an estimate of how the memory generation tool 330 might allocate the slice resources for the design. In this planning process the designer could allow more or less tolerance to test the sensitivity of the slice resources in satisfying the requirements.

Recall the example presented in the Background wherein a customer wanted three memories: (1) 45 bits by 2048 words, one port, and seven nanoseconds cycle time; (2) 32 bits by 512 words, two ports, and seven nanoseconds cycle time; and (3) 32 bits by 512 words, four ports with a three nanosecond cycle time. These customer memories were to be derived from a slice having four diffused memories, each 40 bits wide by 1024 words deep, having two-ports and a five nanosecond synchronous cycle time. The memory generation tool 330 tool as described herein may construct the customer's memory from the diffused memory array by a logical arrangement side-by-side to form wider arrays and/or a logical addressing scheme end-to-end to form deeper arrays. Indeed, all four arrays could be used in a 2×2 logical arrangement to form the first required 45×2048 memory array but this alternative uses all four available arrays and may not be the optimum, especially if the other two required arrays are to be built from the logic array. A more optimal solution might be to use two arrays end-to-end as a 40×2048 logical array and use the logic gate array of the slice to augment the array with a 3×R-cell array. The customer's second memory then could be placed in one of the two remaining diffused memories and the third required memory could be built in the logic gate array of the slice to accommodate the faster cycle time not met by any of the diffused arrays. The design requirements of the memory arrays above is but a simple example; in actuality, modern circuit designs easily require several hundred arrays with varying requirements, and the slice itself may have diffused memory of varying size, organization and performance capabilities.

Following will be description of how specific memories may be created using the memory generation tool 330 and the application set of FIG. 2. Please remember that methodology and specific memory construction is by way of example only and is in no way intended to limit the invention to the particular memory arrays and buffers. It is helpful to view FIG. 3 and FIG. 4, a simplified flow chart of the process used by the memory generation tool 330, in conjunction with FIG. 5, a simplified block diagram of the functional chip. In this example the application set 210 and the customer specification 320 are used to create a network or communication chip 510 for data transmission between two different high speed data protocols, one according to the industry standard SPI4.2 and the other according to the industry standard of gigabit Ethernet. Recall that the slice definition 110 had two PHYs 116 and 118, having adjacent memory configured to accommodate the desired protocols. The gate array 140 was configured into a memory array 214 of 256 columns×78 rows to facilitate data transmission according to the SPI4.2 protocol. The gate array 140 was also configured into a memory having width and depth of 256 columns×70 rows for the ten gigabit Ethernet media independent extender sublayer (XGXS) 220. First, the memory composer 338 of memory generation tool 330 created the required memories 214 and 220, as well as the eight diffused memories 120–134. The memory manager 332 stored these memories into the memory resource database 330. At this stage the memory manager 332 was not attempting to manage the amount of fixed resource being consumed by the designs, the creation of these additional two protocol layer memories 214 and 220 merely facilitated RTL development and verification. Not until the association of the physical memory to the logical memory is made are accurate timing modeling and analysis possible. The memory designs 350 at this stage are Verilog models of the requested memories, examples of which are provided below:

RR211-256X70
module RR211 - 256X78-bussed (DOA,AADR,BADR,CLKA,CLKB, DIB,WEB,ENA,ENB,RAPID MEM
TEST-LN,-MEM-TEST OUT, -MEM TESI~-GLOBAL-
IN, _MEM TEST-GLOBAL-OUT);
    input [7:0] AADR;
    input [7:0] BADR;
    input CLKA;
    input CLKB;
    input [69:01 DIB;
    input [69:0] WEB;
    input ENA;
    input ENB;
    input [X:O]-MEM-TESI~-IN;
    output [69:0] DOA;
    output [A:0]-MEM_TEST_OUT;
    ...

-continued

```
end module:
RR211-256x78
module RR211-256X78_bussed (DOA,AADR,BADR,CLKA,CLKB,
DIB,WEB,ENA,ENB, MEM TEST--IN,
-MEM TEST OUT, -MEM TEST~-GLOBAL-IN, MEM TEST~
-GLOBAL-OUT);
    input [7:0] AADR;
    input [7:0] BADR;
    input CLKA;
    input CLKB;
    input [77:0] DIB;
    input [77:0] WEB;
    input ENA;
    input ENB;
    input [X:O]-MEM-TEST-IN;
    output [77:0] DOA;
    output [A:0]-MEM-TEST_OUT;
    ...
end module;
```

The memory created by memory generation tool 330 is instantiated by the designer using a memory compiler, such as flexstream available from LSI Logic or others as known in the art. The logical memory is associated with the physical instances by using the physical instance name from the RTL shell in the chip's RTL hierarchy. When the memory generation tool 330 tool is run to create memory based on physical resource cross reference, the cross reference can be done by the memory generation tool 330 tool, the chip integrator 380, and/or both. The memory generation tool 330 provides the ability to assign particular memories for a particular need while optimizing the assignments. The association between logical and physical memories can be made either by specifying input into the memory manager 332 or by allowing the memory manager 332 to make the association. The memory manager 332 also has the ability to maintain the current or newly specified correlation. After the logical and physical memories have been associated, the updated memory designs 350 are updated if the memory blocks changed, i.e., if R-cells or gate arrays were used instead of diffused memory or visa versa. Timing, synthesis, and an updated cross reference list below are also provided by the memory composer 338 and the memory manager 332. When the memory generation tool 330 assigns logical memories to physical resources, the test port list for the memory block may change, so one may have to reconnect the test ports on the memory to the appropriate test structure with an appropriate testing tool. Thus, the memory resource database 334 of the application set 210 is given in Table 1.

Figure 4:
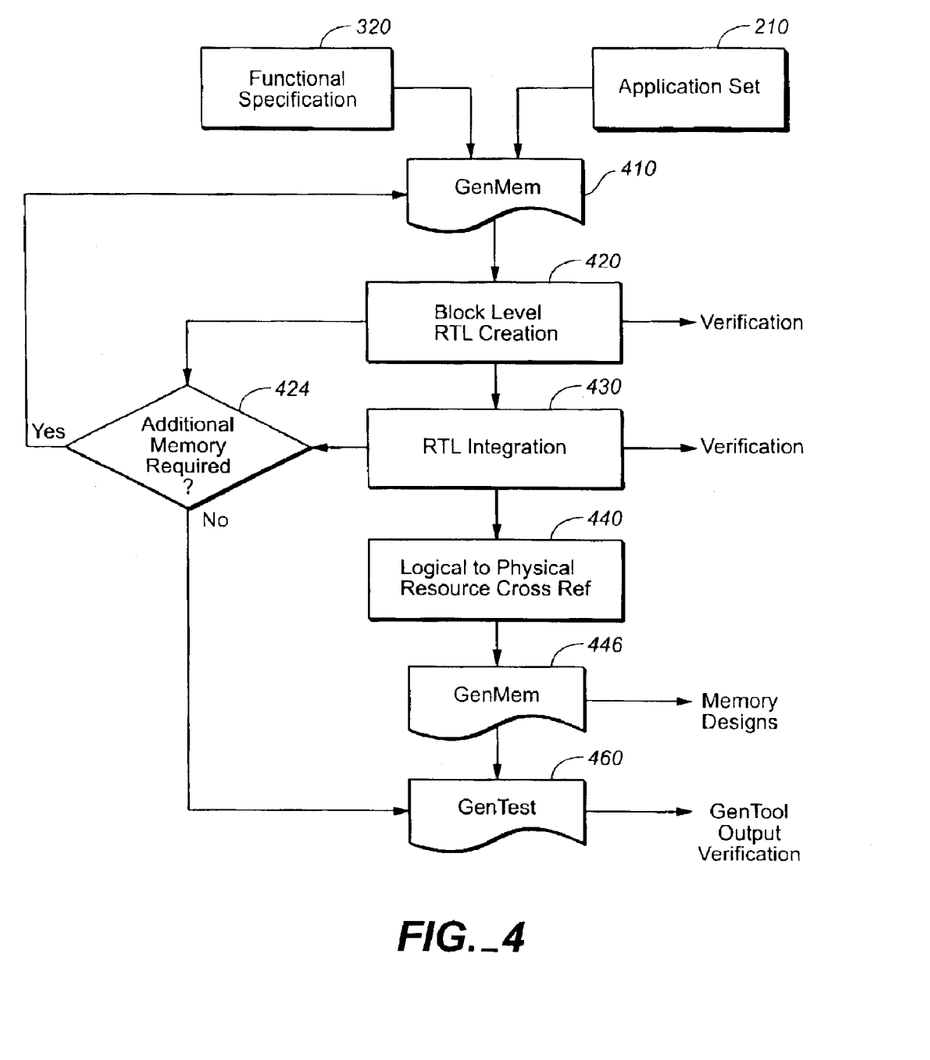
FIG. 4 is a simplified flow chart of a process by which memory can be configured and/or created according to principles of the invention.
Figure 5:
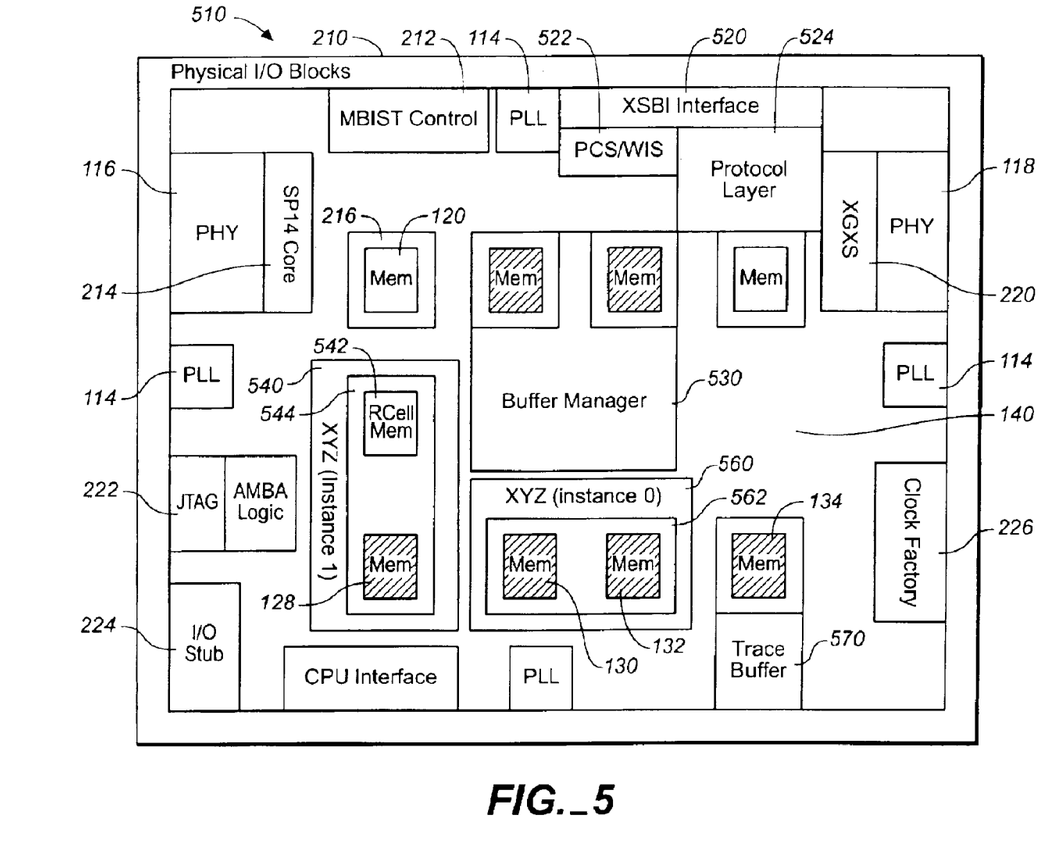
FIG. 5 is a simplified block diagram of a more completed integrated circuit having memory that has been configured and/or created according to principles of the invention.

The customer specification 320 requests two additional memories for simulation and verification: (1) a trace buffer logic 570 having 256 columns×80 rows; and (2) an array 540, 560 for the customer's proprietary logic having 256 columns×160 rows. These two memories were not diffused into the application set 210 and so must be generated. Two memories of 256 columns×76 rows are required for the buffer manager of 256 columns×80 rows; one may be created from the diffused memory 134 and another created from the gate array logic 140 to form the trace buffer 570. With respect to FIG. 4, the customer specification 320 and the application set 210 are input at step 410 to the memory generation tool. In step 420, the trace buffer 570 is created for simulation and verification and the physical to logical correlation is performed to connect the design. Also in step 420, Instance0 560 of the proprietary memory was generated from two diffused memories 130 and 132 with the appropriate logic 562. The memory generation tool 330 now instantiates the trace buffer 570 and Instance0 560 of the proprietary memory by associating the logical requirements of the application to the physical memories available at step 440. This step, step 440, of correlating the physical memory to the logical memory is required to obtain timing information. A test generation tool is used at step 460 to create and connect test structures. Again, the association between logical and physical memories can be made either by specifying input into the memory manager 332 or by allowing the memory manager 332 to make the association.

Because the additional memory requirements for the company's proprietary logic are greater than can be satisfied by the remaining diffused memories of the application set, additional memory is required as in step 424. Thus, the memory generation tool is invoked again at step 410 so that the remaining proprietary memory Instance1 540 is regenerated using a combination of diffused memory 128 and gate array logic 140 into an R-cell memory 542. The appropriate memory wrapper 544 for Instance1 540 is enabled during the integration phase at step 430. At this time, the memory designs 350 may be updated Verilog models which are necessary only because the memory building blocks changed in creating Instance1 540, i.e. an R-cell and diffused memories were reconfigured,. The memory designs also contain timing synthesis. The memory manager updates the memory resource database by indicating which portions of the memory resources have been allocated to which logical memories. In this example, the proprietary memory Instance1 540 has been recreated so its timing will be different from the previous version. In addition, its test ports will be altered. Thus, a specialized test generation tool will need to create and connect the MBIST engines to the new memory 540 at step 460, although a chip developer may methodically create the controller and the connections. The table below comprises some of the information stored in the memory resource database 334.

TABLE 1

Memory Resource Database

| Memory | Physical Location | Physical Name | Logical Name | Full Path Instance Name | Correlation Fixed |
|---|---|---|---|---|---|
| RR211_256x80 | 3,2 | RR211_256x80_3,2 | 211-256x78 | RTM/RFM/SP14/211-256x78:Srcbuf | x |
| RR211_256x80 | 4,2 | RR211_256x80_4,2 | | | |
| RR211_256x80 | 6,2 | RR211_256x80_6,2 | | | |
| RR211_256x80 | 7,2 | RR211_256x80_7,2 | 211-256x70 | RTM/RFM/XGXS/211-256x70:Imbuf | x |
| RR211_256x80 | 3,5 | RR211_256x80_3,5 | | | |
| RR211_256x80 | 4,5 | RR211_256x80_4,5 | | | |
| RR211_256x80 | 6,5 | RR211_256x80_6,5 | | | |
| RR211_256x80 | 7,5 | RR211_256x80_7,5 | | | |

TABLE 2

Updated Memory Resource Database

| Memory | Physical Location | Physical Name | Logical Name | Full Path Instance Name | Fixed |
|---|---|---|---|---|---|
| RR211__256x80 | 3,2 | RR211__256x80__3,2 | 211-256x78 | RTM/RFM/SP14/211-256x78:Srcbuf | x |
| RR211__256x80 | 4,2 | RR211__256x80__4,2 | 211-256x160 | RTM/RCM/UCM/XYZ-I/211-256x160:xram | |
| RR211__256x80 | 6,2 | RR211__256x80__6,2 | 211-256x160 | RTM/RCM/UCM/XYZ-I/211-256x160:xram | |
| RR211__256x80 | 7,2 | RR211__256x80__7,2 | 211-256x70 | RTM/RFM/XGXS/211-256x70:Imbuf | x |
| RR211__256x80 | 3,5 | RR211__256x80__3,5 | | | |
| RR211__256x80 | 4,5 | RR211__256x80__4,5 | 211-256x160 | RTM/RCM/UCM/XYZ-0/211-256x160:xram | |
| RR211__256x80 | 6,5 | RR211__256x80__6,5 | 211-256x160 | RTM/RCM/UCM/XYZ__0/211-256x160:xram | |
| RR211__256x80 | 7,5 | RR211__256x80__7,5 | 211-256x80 | RTM/RCM/UCM/trace/211-256x80:tbuf | |

Alternatively, the memory generation tool 330 could have chosen to fix all of the previously generated memory modules to their currently assigned physical memories. In this case one of the memory modules for the buffer manager would have been composed of R-cell based memory. In that case, information within the memory resource database might look like Table 3.

TABLE 3

Alternative Updated Memory Resource Database

| Memory | Physical Location | Physical Name | Logical Name | Full Path Instance Name | Fixed |
|---|---|---|---|---|---|
| RR211__256x80 | 3,2 | RR211__256x80__3,2 | 211-256x78 | RTM/RFM/SP14/211-256x78:Srcbuf | x |
| RR211__256x80 | 4,2 | RR211__256x80__4,2 | 211-256x76 | RTM/RCM/UCM/BM/211-256x76:bram0 | |
| RR211__256x80 | 6,2 | RR211__256x80__6,2 | 211-256x76 | RTM/RCM/UCM/BM/211-256x76:bram1 | |
| RR211__256x80 | 7,2 | RR211__256x80__7,2 | 211-256x70 | RTM/RFM/XGXS/211-256x70:Imbuf | x |
| RR211__256x80 | 3,5 | RR211__256x80__3,5 | 211-256x160 | RTM/RCM/UCM/XYZ-1/211-256x160:xram | |
| RR211__256x80 | 4,5 | RR211__256x80__4,5 | 211-256x160 | RTM/RCM/UCM/XYZ-0/211-256x160:xram | |
| RR211__256x80 | 6,5 | RR211__256x80__6,5 | 211-256x160 | RTM/RCM/UCM/XYZ-0/211-256x160:xram | |
| RR211__256x80 | 7,5 | RR211__256x80__7,5 | 211-256x80 | RTM/RCM/UCM/trace/211-256x80:tbuf | |

Under these circumstance, the MBIST engines required to test the instantiated memory must be created and the test ports of the instantiated memories must be connected, as before. It is highly recommended, moreover, that the test generation tool be used to connect the test ports of the memory through the hierarchy to the MBIST controllers 212. However, it is valid for the user to make the necessary corrections. The other components of FIG. 5 that make the chip functional include, e.g., RTL shells that may have been created by other generation tools, e.g., data transmission protocol layers 520, 522, 524.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. A memory generation tool, comprising:
   (a) a memory manager having as input an application set of an integrated circuit and a request for at least one memory to be fabricated with the integrated circuit;
   (b) a memory resource database comprising a plurality of available memory resources comprising diffused memory and/or logic gate arrays of the application set;
   (c) a memory resource selector capable of selecting memory resources of the application set to satisfy the request; and
   (d) a memory composer capable of generating at least one memory design comprising a synthesis script for a R-cell memory derived from the logic gate array to satisfy the request for at least one memory on the integrated circuit from the memory resources of the application set.

2. The memory generation tool of claim 1, wherein the memory design comprises a second synthesis script or a flop-based memory derived from the logic gate array to satisfy the request.

3. The memory generation tool of claim 1, wherein the memory design comprises a memory wrapper.

4. The memory generation tool of claim 1, wherein the memory manager further maintains the memory resource database.

5. The memory generation tool of claim of claim 4, wherein the memory manager updates the memory resource database to indicate that an available memory resource has been allocated to satisfy the request.

6. The memory generation tool of claim 1, wherein the memory resource selector selects more than one available memory resource to satisfy the request.

7. The memory generation tool of claim 6, wherein the memory resource selector gives priority to the more than one available memory resources that have compatible power and/or timing and/or size.

8. A memory generation tool, comprising:
   (a) a memory manager having as input a description of a slice and a request for at least one memory;
   (b) a memory resource database comprising a plurality of available memory resources of the description, the available memory resources comprising diffused memory and logic gate arrays, the memory manager to maintain and update the memory resource database to indicate that an available memory resource has been allocated to satisfy the request;

(c) a memory resource selector capable of selecting candidate memory resources from the available memory resources to satisfy the request wherein the memory resource selector give priority to the available memory resources that have compatible power and/or timing and/or size when selecting candidate memory resources; and (d) a memory composer capable of generating at least one memory design having a plurality of shells, wherein at least one shell is a RTL memory wrapper and others of the plurality of shells comprise synthesis scripts for at least a R-cell memory and a flop-based memory derived from the logic gate array from the candidate memory resources to satisfy the request to indicate that an available memory resource has been allocated to satisfy the request.

9. The memory resource tool of claim 8, further comprising:

(a) a design database of a plurality of hardmacs assigned and configured for a plurality of functions of the integrated circuit;

(b) a design integrator to integrate the at least one memory design into the plurality of functions of the integrated circuit; and (c) a design qualifier to determine if the at least one memory design is compatible with the plurality of functions of the integrated circuit.

10. An article of manufacture, comprising a data storage medium tangibly embodying a program of machine readable instructions executable by an electronic processing apparatus to perform method steps for operating an electronic processing apparatus, said method steps comprising the steps of:

(a) reading a description of a slice having at least one memory of either diffused and/or gate array logic;

(b) reading a specification of at least one requested memory to be fabricated in an integrated circuit;

(c) determining if the specification of the at least one requested memory can be generated from the description of the slice;

(d) allocating a portion of the at least one memory of either diffused and/or gate array logic of the description of the slice to the at least one requested memory;

(e) generating a logic infrastructure for the allocated portion;

(f) creating a memory design having a plurality of shells, wherein at least one shell is a RTL memory wrapper and others of the plurality of shells comprise synthesis scripts for at least a R-cell memory and a flop-based memory derived from the logic gate array from the candidate memory resources for the allocated portion; and (g) updating a memory resource database to indicate the allocated portion is not available for anymore of the at least one requested memories.

11. The article of manufacture of claim 10, wherein the method steps embodied in the program of machine readable instructions executable by an electronic processing apparatus further comprises the steps of:

(a) determining if the specification of another of the at least one requested memory can be generated from the description of the slice;

(b) allocating another portion of the at least one memory of either diffused and/or gate array logic of the description of the slice to the another memory;

(c) generating a logic infrastructure for the another allocated portion;

(f) creating a memory design having a plurality of shells, wherein at least one shell is a RTL memory wrapper and others of the plurality of shells comprise synthesis scripts for at least a R-cell memory and a flop-based memory derived from the logic gate array from the candidate memory resources for the another allocated portion; and (g) updating a memory resource database to indicate the another allocated portion is not available for anymore of the at least one requested memories.

12. A method of generating memory designs for an integrated circuit, comprising the steps of:

(a) inputting available memory resources of an application set to be constructed as an integrated semiconductor product into a memory resource database, the available memory resources comprising logic gate arrays;

(b) inputting a request for at least one memory;

(c) selecting possible memory resources from the available memory resources of the application set for generation of a memory design from which the request for the at least one memory on the integrated semiconductor product can be constructed; and (d) generating a memory design having a plurality of shells, wherein at least one shell is a RTL memory wrapper and others of the plurality of shells comprise synthesis scripts for at least a R-cell memory and a flop-based memory derived from the logic gate arrays from the possible memory resources to satisfy the request for the at least one memory.

13. The method of claim 12, wherein the step of selecting further comprises considering the size, power, timing characteristics of the possible memory resources to satisfy the request.

14. The method of claim 13, further comprising generating a memory design by combining two or more possible memory resources having compatible size, power, and timing characteristics to satisfy the request.

15. A memory generation tool further comprising:

(a) means to input an application set of an integrated semiconductor product having at least one diffused and/or gate array logic;

(b) means to read a specification of requested memory;

(c) means to determine if the requested memory can be generated from the at least one diffused and/or gate array logic;

(d) if not, means to notify a user;

(e) if so, means to allocate a portion of the at least one diffused and/or gate array logic to the requested memory;

(f) means to determine if there is additional diffused and/or gate array logic available;

(g) means to determine if there is a second requested memory;

(h) means to allocate a second portion of the additional diffused and/or gate array logic to the second requested memory;

(i) means to combine one or more portions of the diffused and/or gate array logic together to allocate to the requested memory;

(j) means to generate a memory wrapper for the allocated portions; and (k) means to generate memory designs having a plurality of shells, wherein at least one shell is a RTL memory wrapper and others of the plurality of shells comprise synthesis scripts for at least a R-cell memory and a flop-based memory derived from the gate array logic from the candidate memory resources for the allocated portions and the memory wrapper.

* * * * *